United States Patent
Hahnlen et al.

(10) Patent No.: US 10,807,186 B2
(45) Date of Patent: Oct. 20, 2020

(54) HYBRID STRUCTURES FOR JOINING OF METALS AND CONTINUOUS FIBER MATERIALS

(71) Applicants: HONDA MOTOR CO., LTD., Minato-ku, Tokyo (JP); Ohio State Innovation Foundation, Columbus, OH (US)

(72) Inventors: Ryan Hahnlen, Dublin, OH (US); Duane Detwiler, Powell, OH (US); Allen Sheldon, Columbus, OH (US); Marcelo Dapino, Columbus, OH (US); Mark Bryant Gingerich, Columbus, OH (US); Matthew Scheidt, Columbus, OH (US); Leon Headings, Columbus, OH (US)

(73) Assignees: HONDA MOTOR CO., LTD., Tokyo (JP); OHIO STATE INNOVATION FOUNDATION, Columbus, OH (US)

(*) Notice: Subject to any disclaimer, the term of this patent is extended or adjusted under 35 U.S.C. 154(b) by 234 days.

(21) Appl. No.: 15/479,953

(22) Filed: Apr. 5, 2017

(65) Prior Publication Data
US 2017/0291253 A1 Oct. 12, 2017

Related U.S. Application Data

(60) Provisional application No. 62/319,113, filed on Apr. 6, 2016.

(51) Int. Cl.
*B23K 11/16* (2006.01)
*B23K 11/11* (2006.01)
*B23K 103/16* (2006.01)

(52) U.S. Cl.
CPC .............. *B23K 11/16* (2013.01); *B23K 11/115* (2013.01); *B23K 2103/16* (2018.08)

(58) Field of Classification Search
CPC ... B23K 11/115; B23K 11/16; B23K 2103/16; C22C 47/00; C22C 47/06; C22C 47/20;
(Continued)

(56) References Cited

U.S. PATENT DOCUMENTS

| 4,929,513 A | 5/1990 | Kyono et al. |
| 6,685,365 B2 | 2/2004 | White |

(Continued)

FOREIGN PATENT DOCUMENTS

| CN | 105458256 A | 4/2016 |
| DE | 10060042 A1 * | 6/2002 ............. B29C 70/86 |

(Continued)

OTHER PUBLICATIONS

Balle, F., et. al., "Improvement of Ultrasonically Welded Aluminum/Carbon Fiber Reinforced Polymer-Joints by Surface Technology and High," Wiley Online Library, Resolution Analysis Advanced Engineering Materials, 2013.

(Continued)

*Primary Examiner* — Camie S Thompson
(74) *Attorney, Agent, or Firm* — Arent Fox LLP

(57) ABSTRACT

A transition structure includes a metallic portion, a fiber portion including a plurality of tows embedded within the metallic portion and extending out from the metallic portion forming a fabric, and a binding material forming a matrix surrounding the fiber portion embedded within the metallic portion. The fiber portion may be attached to or form part of a composite vehicle component. The transition structure may join a metallic component and a composite component. The transition structure may be manufactured by creating first channels within a layer of a metallic substrate, inserting fiber tows into the first channels, placing a first metallic layer over the metallic substrate and the fiber tows, consolidating the metallic layer to the metallic substrate, and binding the (Continued)

fiber tows within a resin. Prior to binding, additional layers of channels and fiber tows may be consolidated onto the first metallic layer.

26 Claims, 17 Drawing Sheets

(58) Field of Classification Search
CPC ......... C22C 47/08; C22C 47/14; C22C 1/042; C23C 49/14; B62D 29/04; B29C 45/14; B29C 65/64; B29C 70/84; B29C 70/82; B29C 37/0082; B63B 3/20; B29K 2705/00; B29L 2031/08; B29L 2031/7504; B32B 7/08; Y10T 428/249923
USPC .................................... 428/293.1, 223, 102
See application file for complete search history.

(56) References Cited

U.S. PATENT DOCUMENTS

| | | | |
|---|---|---|---|
| 7,662,002 | B2 | 2/2010 | Johnston |
| 9,862,140 | B2 | 1/2018 | Lewicki et al. |
| 2006/0142140 | A1 | 6/2006 | White |
| 2014/0322482 | A1* | 10/2014 | Sinha ............... B29C 70/72 428/102 |
| 2016/0311051 | A1 | 10/2016 | Nordman |
| 2016/0333733 | A1 | 11/2016 | Robertson, Jr. |
| 2017/0291253 | A1 | 10/2017 | Hahnlen et al. |
| 2018/0126669 | A1 | 5/2018 | Choi et al. |

FOREIGN PATENT DOCUMENTS

| | | |
|---|---|---|
| DE | 10 2016 202 755 A1 | 8/2017 |
| KR | 10-1668955 B1 | 10/2016 |

OTHER PUBLICATIONS

Balle, F., et. al., "Joining of Dissimilar Materials by Ultrasonic Metal Welding," Proceeding of the 2013 International Congress on Ultrasonics, 2013.

Balle, F., et. al., Ultrasonic metal welding of aluminium sheets to carbon fibre reinforced thermoplastic composites, Wiley Online Library, Advanced Engineering Materials, vol. 11, pp. 35-39, 2009.

Balle, F., et. al., "Ultrasonic spot welding of aluminum sheet/carbon fiber reinforced polymer—joints," Wiley Online Library, Materialwissenschaft und Werkstofftechnik, vol. 38, pp. 934-938, 2007.

Konchakova, N., et. al., Damage and Failure of Metal/Fibre-Reinforced Polymer Tensile Specimens with Inelastic Interface, Wiley Online Library, PAMM, vol. 10, pp. 119-120, 2010.

Konchakova, N., et. al., "Finite element analysis of an inelastic interface in ultrasonic welded metal/fibre-reinforced polymer joints," Elsevier, Computational Materials Science, vol. 50, pp. 184-190, 2010.

Kong, C., et. al., "Method for embedding optical fibers in an aluminum matrix by ultrasonic consolidation," Applied Optics, vol. 44, No. 30, 2005.

Kruger, S., "Ultrasonic welding of metal/composite joints," Wiley Online Library, Advanced Engineering Materials, vol. 6, pp. 157-159, 2004.

Liu, F., "Joining of Metal to plastic using friction lap welding," Elsevier, Materials & Design, vol. 54, pp. 236-244, 2014.

Matsuoka, S., "Ultrasonic welding of ceramics/metals using inserts," Elsevier, Journal of materials processing Technology, vol. 75, pp. 259-265, 1998.

Ucsnik, S., "Experimental investigation of a novel hybrid metal—composite joining technology," Elsevier, Composites Part A: Applied Science and Manufacturing, vol. 41, pp. 369-374, 2010.

Wagner, G., et. al., "Ultrasonic Welding of Aluminum Alloys to Fiber Reinforced Polymers," Wiley Online Library, vol. 15., pp. 792-803, 2013.

Yulong, Li, "Ultrasonic embedding of nickel-coated fiber Bragg grating in aluminum and associated sensing characteristics," Optical Fiber Technology, vol. 18, pp. 7-13, 2012.

* cited by examiner

HYBRID STRUCTURES FOR JOINING OF METALS AND CONTINUOUS FIBER MATERIALS

CLAIM OF PRIORITY UNDER 35 U.S.C. § 119

The present application for patent claims priority to Provisional Application No. 62/319,113 entitled "HYBRID STRUCTURES FOR JOINING OF METALS AND CONTINUOUS FIBER MATERIALS" filed Apr. 6, 2016, which is assigned to the assignees hereof, and incorporated herein by reference in its entirety.

BACKGROUND

Composite materials such as carbon fiber reinforced polymers offer a high strength or stiffness to weight ratio and may be used to replace traditional metal components in a variety of applications such as automotive and aerospace. Metal components, however, may be preferred for other components within the same application. Accordingly, there is a need to join composite components to metal components.

Traditional methods of joining composite components to metal components use a combination of adhesive and mechanical joining techniques. For example, an adhesive is used to bind the polymer to the metal, then a mechanical fastener is driven through the composite component and the mechanical component. Such traditional methods may damage the reinforcing material and create joints that are weaker than the components. For example, where continuous fiber materials are used, a mechanical fastener may break the continuous fibers, creating a point of weakness.

In view of the foregoing, there is a need for improvements to techniques for joining metals and continuous fiber materials. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

According to one aspect of the present disclosure, a transition structure, includes a metallic portion and a fiber portion. The fiber portion includes a plurality of tows embedded within the metallic portion and extending out from the metallic portion to form a fabric. The transition structure also includes a binding material forming a matrix surrounding the fiber portion embedded within the metallic portion.

In another aspect, a vehicle component includes a fiber reinforced polymer body and a metallic attachment portion. At least a portion of the fiber reinforced polymer body is embedded within the metallic attachment portion.

In another aspect, a method of manufacturing a transition structure or vehicle component includes creating first channels within a metallic substrate. The method also includes inserting first fiber tows into the first channels. The method further includes placing a first metallic layer adjacent to the metallic substrate and the first fiber tows. The method additionally includes consolidating the first metallic layer to the metallic substrate and the first fiber tows. The method also includes binding the fiber tows within a resin.

In another aspect, a method of joining a composite component to a metallic component includes providing a transition component including a fiber fabric portion and a metallic portion, wherein fibers forming the fiber fabric portion extend into and are embedded within the metallic portion. The method also includes joining the fiber fabric portion to the composite component within a polymer matrix. The method further includes joining the metallic portion to the metallic component.

In another aspect, a transition structure, includes a metallic portion and a multi-layer fiber portion including a plurality of tows embedded within the metallic portion at different layers and extending out from the metallic portion forming a fabric.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Figure 1:
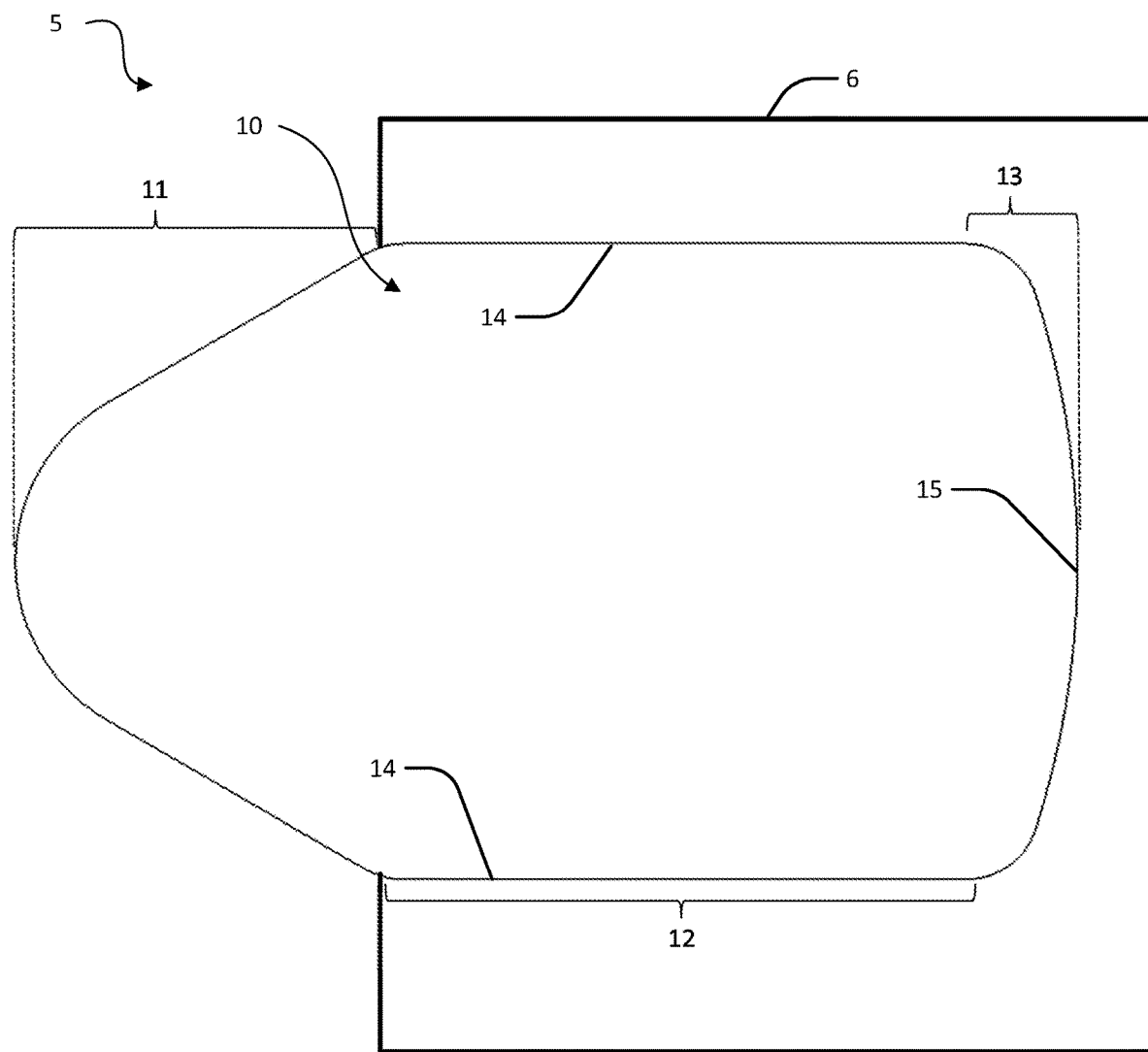
FIG. 1 illustrates an example transition structure having a convex transition region according to an aspect of the disclosure.

The following includes definitions of selected terms employed herein. The definitions include various examples and/or forms of components that fall within the scope of a term and that may be used for implementation. The examples are not intended to be limiting.

A "vehicle," as used herein, refers to any manned or unmanned structure capable of moving and is powered by any form of energy. The term "vehicle" includes, but is not limited to: cars, trucks, vans, minivans, SUVs, motorcycles, scooters, boats, personal watercraft, submersibles, aircraft, and spacecraft. In some cases, a motor vehicle includes one or more engines.

Generally described, the present disclosure provides for techniques joining fiber reinforced composite materials and metal materials. For example, some vehicle components may be manufactured of reinforced composite materials but need to be joined to metallic vehicle components. For example, a composite vehicle roof may be joined to a metallic vehicle frame. In an aspect, a transition structure provides an interface between a fiber reinforced composite component and a metallic component. The transition structure may include fibers having a portion embedded within a metallic sheet and one or more free ends that extends from one or more edges of the metallic sheet. The fibers may be bundles of continuous fibers referred to herein as tows. The tows may be part of unidirectional fiber mats, woven fiber mats, or single tows. The free ends of the tows may be interlayered with fiber sheets of the composite component and the polymer (e.g., epoxy) may bind the tows within the composite component. The epoxy may form the binding polymer for a carbon, or other, fiber reinforced polymer component. A metal engagement portion of the transition structure, which may include no embedded fibers, may be welded or mechanically fastened to the metallic component.

In an aspect, the transition structure may be manufactured using an additive manufacturing process and/or computer numerical controlled machining operations. For example, using ultrasonic additive manufacturing (UAM), layers of metallic foil may be consolidated layer-by-layer to form the metallic portions of the transition structure. Other additive manufacturing techniques such as explosion welding and impulse welding may also be used. Further, the metallic portions may be machined, formed, embossed, or additively manufactured to include channels or grooves to hold the fiber tows. In an aspect, the channels may extend across the width and/or length of the transition structure and may be curved or have varying cross section shapes and/or sizes to provide additional mechanical locking of the fiber tows within the metallic portion. Multiple tows may be aggregated within the channels. Adding an additional layer of metallic material in the additive manufacturing process may cause the metal to flow around individual fibers of the fiber tow and mechanically interlock with the tow. This inclusion of a channel prevents fiber crushing and allows metal to metal contact around the fibers. Moreover, the temperature used in the process may be less than a critical temperature, e.g. glass transition, melting, decomposition, or cure temperatures, of a polymeric resin. The process of creating grooves, inserting fiber tows, and adding one or more metallic layers may be repeated to form a multi-layered structure. The channels in each layer may be oriented in different angles such that multiple layers of fiber tows extend from the metallic portion of the transition structure with different orientations. The metallic portion of the transition structure may also include sprue holes extending through the transition structure and interconnecting channels.

The transition structure may be joined with a composite component during manufacture of the composite component. The transition structure may be integrated into the composite structure with other laminates or resin. For example, if dry fiber tows are embedded within the structure, addition of resin may reinforce the joint as capillary action causes the epoxy to wet into voids that were not initially filled with flowing metal during a metal consolidation process. This allows the entire fiber bundle to share load and couple with the mechanical bond of the metal on the outer fibers of the bundle. The resin also results in adhesion between the individual fibers of the embedded tows and the metal channel. Additionally, the epoxy may flow into the sprue holes and form an interlocking matrix within the metallic portion. As another example, the fiber tows may be impregnated with resin (e.g., as a pre-preg). The fibers of the composite structure may also be pre-preg, or a resin may be applied separately. In either case, the external epoxy may bond with the internal epoxy via the sprue holes. Further, the binding material may provide a physical barrier between fibers and metal and help prevent galvanic corrosion by preventing infiltration of electrolytes and electrical continuity between the metal and fibers. In another aspect, fiber glass fabric may be embedded within the metal to avoid carbon-metal electrical continuity and prevent corrosion.

Turning to the figures, where like reference numbers refer to like components, FIG. 1 illustrates an example transition structure 5 including a metallic portion 10 and a fiber composite portion 6. The metallic portion 10 may be formed of any metal or combination of metals compatible with the techniques disclosed herein. For example, the metallic portion 10 may be formed of steel, aluminum, magnesium, titanium, cobalt, beryllium, nickel, columbium, tantalum, tungsten, and alloys thereof, or other structural alloys. A metal attachment region 11 provides a location for attachment to a metallic component, for example, using welding, an adhesive, or a mechanical fastener such as flow drill screws, self-piercing rivets, bolts, or nails. A fiber engagement region 12 includes an area where the fiber tows of fiber portion 6 are embedded within the metallic portion of the transition structure. The fiber tows may include bundles of carbon fibers, glass fibers, other high performance synthetic fibers, and/or natural or biological fibers. The edges 14 of the fiber engagement region 12 may be curved to avoid sharp edges that may cause stress concentrations on a finished component. A fiber transition region 13 is located opposite the metal attachment region 11. The fiber transition region 13 may have a convex edge 15 that may help avoid stress concentration due to a possible stiffness mismatch between the metal component and the composite component. Each of the corners of the metallic portion 10 may be curved with a wide radius to avoid sharp corners that may concentrate stress.

Figure 2:
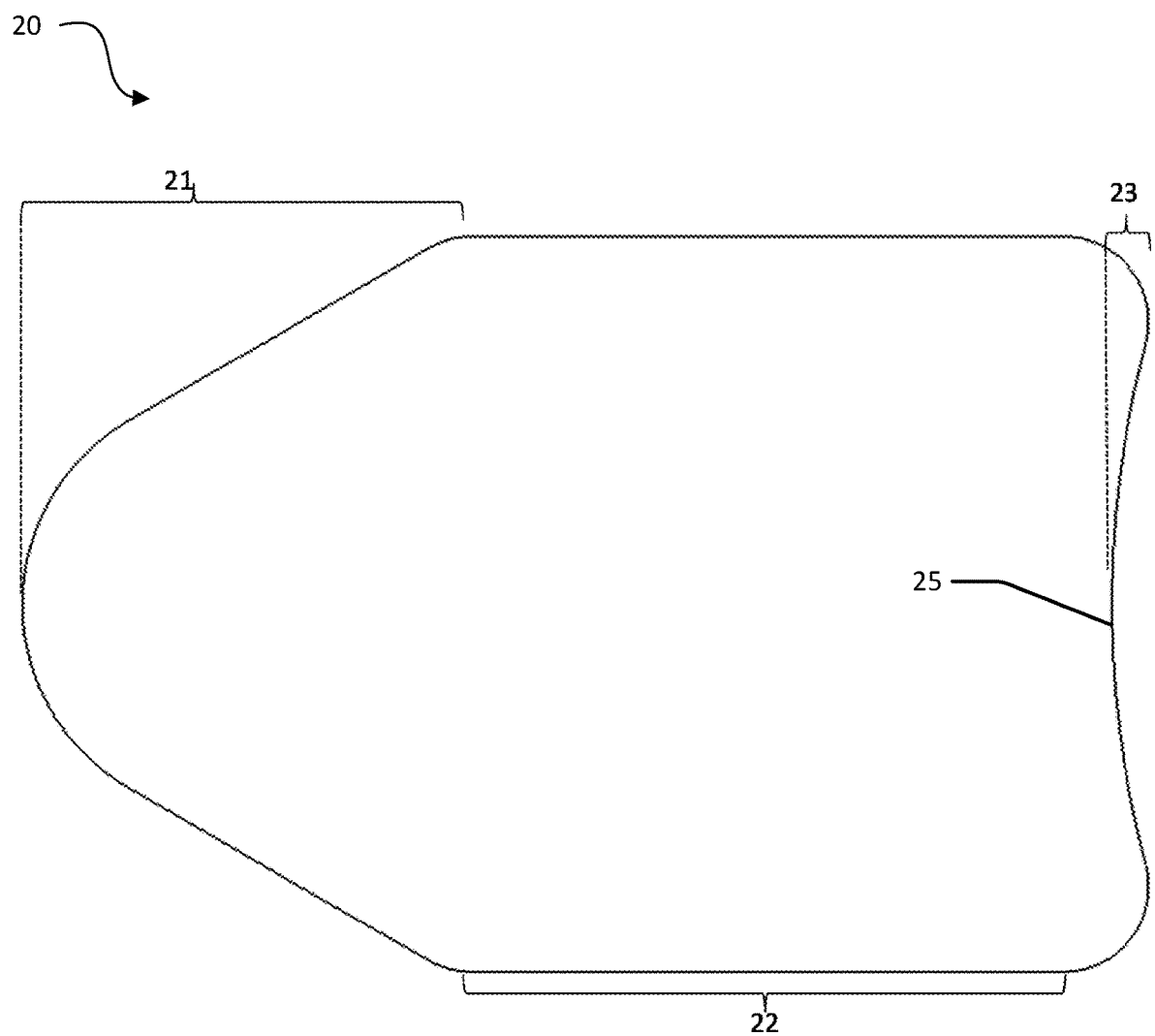
FIG. 2 illustrates an example transition structure having a concave transition region according to an aspect of the disclosure.

FIG. 2 illustrates another example of a metallic portion 20 of an example transition structure. The metallic portion 20 may be similar to the metallic portion 10 with the metal attachment region 21 corresponding to the metal attachment region 11, the fiber engagement region 22 corresponding to the fiber engagement region 22, and the fiber transition region 23 corresponding to the fiber transition region 13. The fiber transition region 23 may have a concave edge 25 to avoid stress concentration due to possible stiffness mismatch between the metal and composite. The shape of the fiber transition region 13 or the fiber transition region 23 may be selected based on the relative stiffness of the finished components and the expected direction of stress on the joint.

Figure 3:
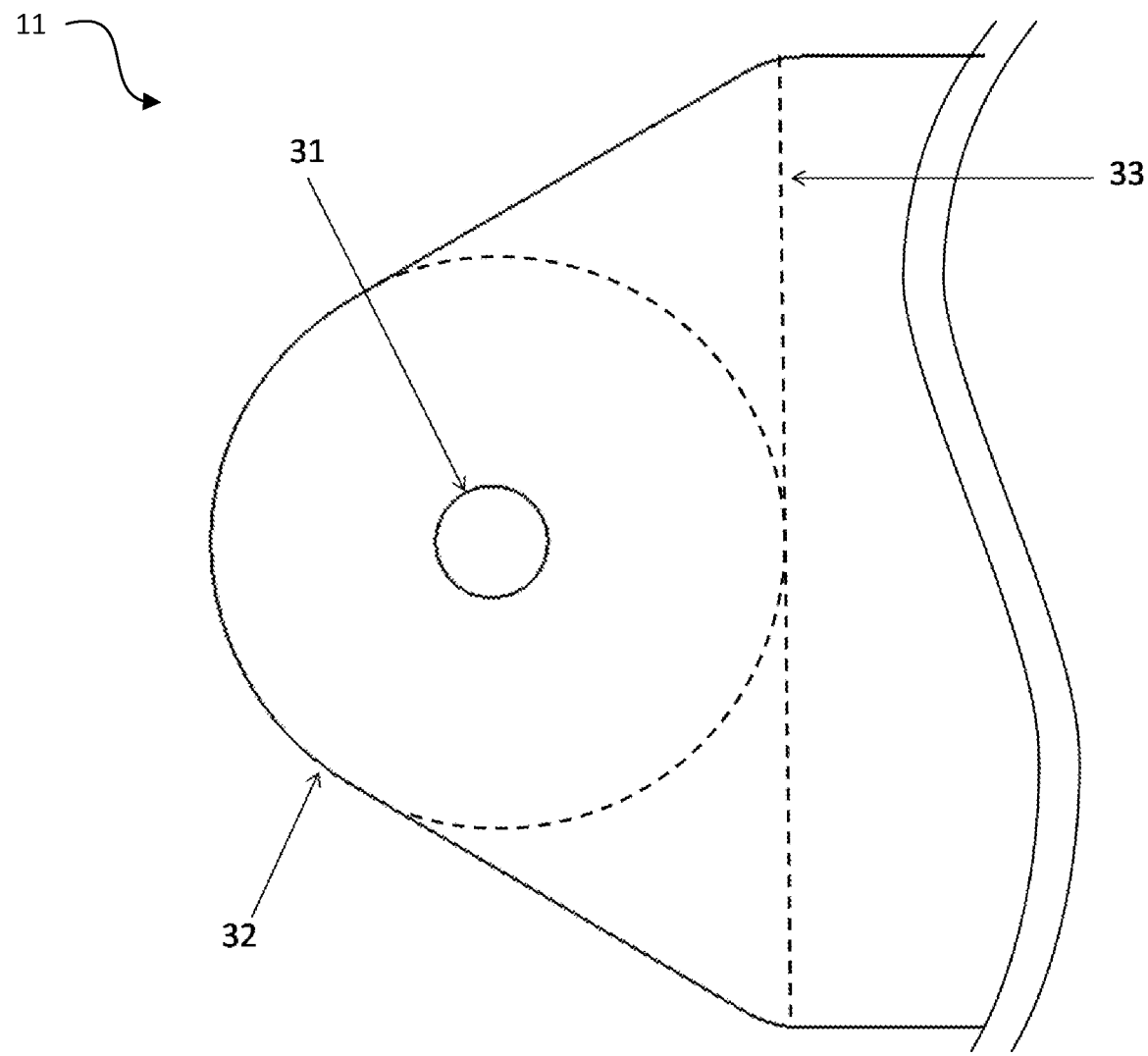
FIG. 3 illustrates details of a metal attachment region of the example transition structure of FIG. 1 or FIG. 2.

FIG. 3 illustrates a detailed view of a metal attachment region 11. A method for joining the transition structure to a metallic component may have an affected area where the joining method would affect the surrounding materials. Moreover, the joining method may require a certain area. For example, as illustrated in FIG. 3, a resistance spot weld 31 may have a defined finite diameter. A free edge 32 of the transition structure may be at least a defined distance from the spot weld 31. For example, the free edge 32 may be a distance of approximately 2-2.5 times the diameter from the spot weld 31. The defined distance may vary based on the type of weld, metal, or mechanical fastener to be used. A start of the fiber transition region 33 may also be located at least the defined distance from the spot weld 31 or the location of the mechanical fastener.

Figure 4:
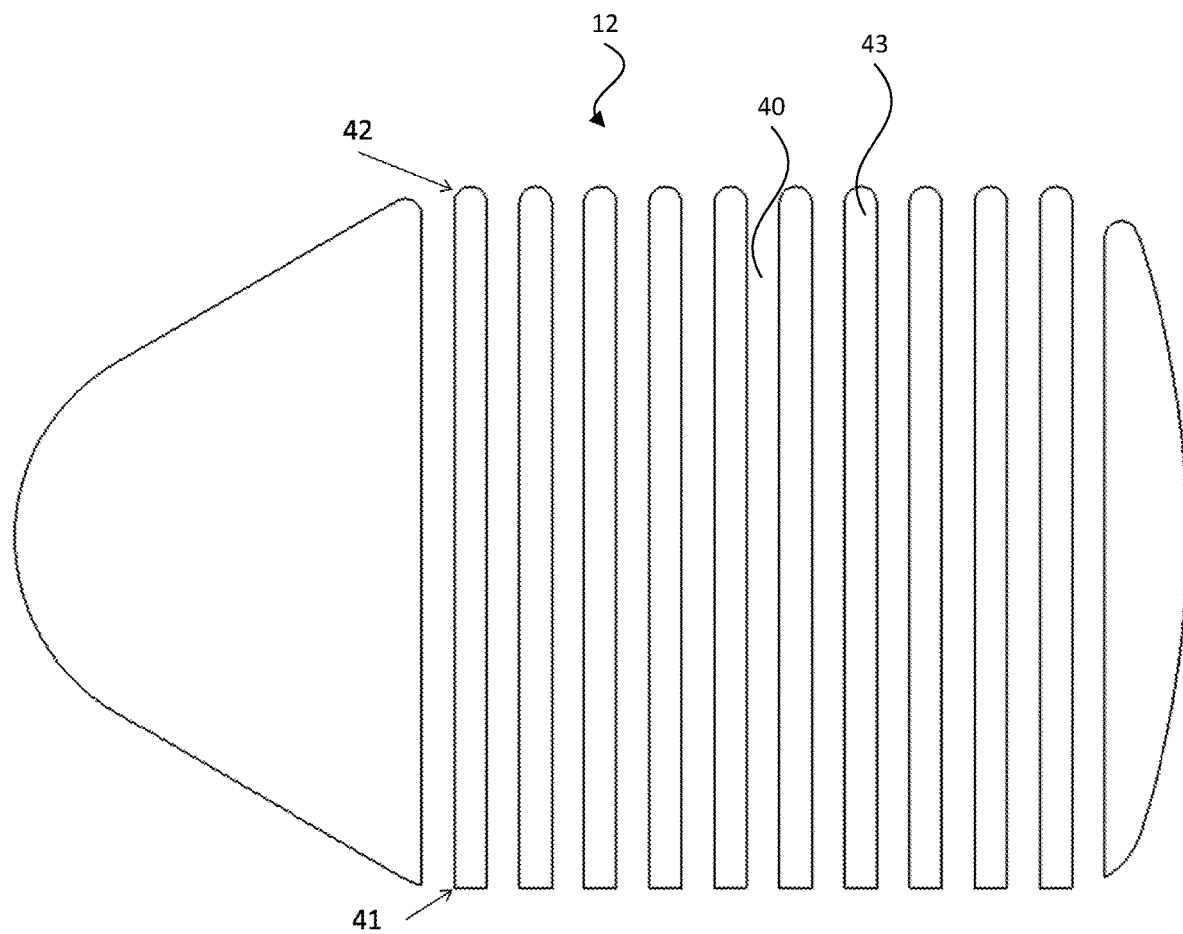
FIG. 4 illustrates widthwise channels in an example transition structure.

FIG. 4 illustrates an example of channels 40 within a fiber engagement region 12. The channels 40 may be portions of the fiber engagement region 12 where metal is not present in one or more layers. For example, the channels 40 may be machined out of a layer of the metal. Laser ablation may also be used to remove metal to form the channels 40. In another aspect, the channels 40 may be created by adding metallic strips 43 surrounding the channels 40 using an additive manufacturing process. As another example, forming can be accomplished by pressing the actual or temporary fiber into the metal, thereby creating an impression of the fiber. Depending on the manufacturing process, the metallic strips 43 may form sharp channel corners 41. The sharp channel corners 41 may be filleted to form rounded corners 42, which form fiber exit holes for the fiber tows extending from the fiber engagement region 12. As illustrated in FIG. 4, the channels 40 may extend across a width of the fiber engagement region 12. In an aspect, continuous fiber tows may be embedded within the channels 40 such that a free end of the fiber tows extends from each end of the channels 40.

Figure 5:
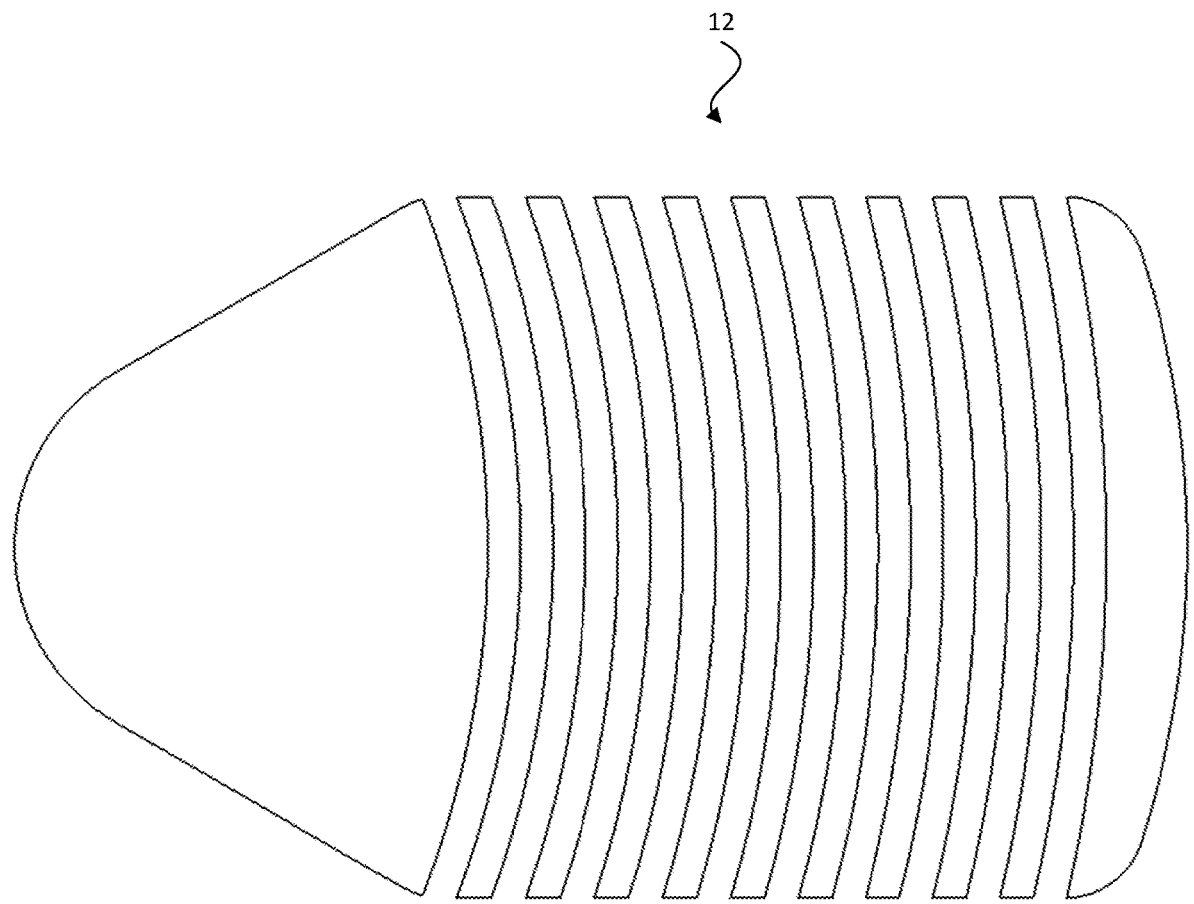
FIG. 5 illustrates curved channels in an example transition structure.

FIG. 5 illustrates another example of a fiber engagement region 12 having curved channels. The curved channels may increase fiber engagement and adhesive surface area to help retain the fiber tows against longitudinal stress. A non-exhaustive list of examples of other channel geometries include circular, semi-circular, arc, and polygonal shapes. In an aspect, the channels may form a "U" shape such that the fiber tows double back on themselves to increase pullout force. As another example, the channels may form an "L" shape or an arc such that the fiber tows enter and exit the transition structure in perpendicular or other relative directions to improve strength for specific targeted loading conditions. Additionally channel spacing may vary to create a smooth stress transition and blind channels terminating within the transition structure may end at different lengths or be staggered to reduce stress concentration. The curved channels may also have filleted corners to prevent sharp corners.

Figure 6:
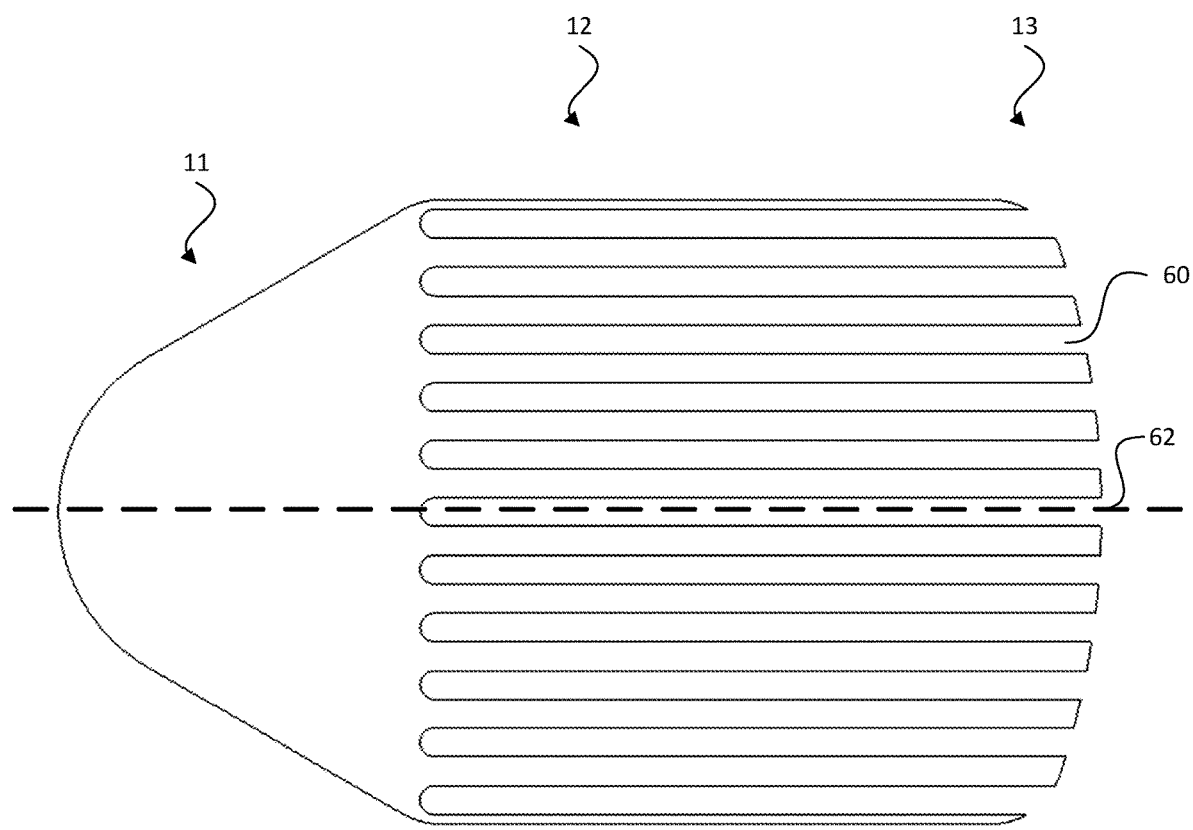
FIG. 6 illustrates lengthwise channels in the example transition structure of FIG. 1.
Figure 7:
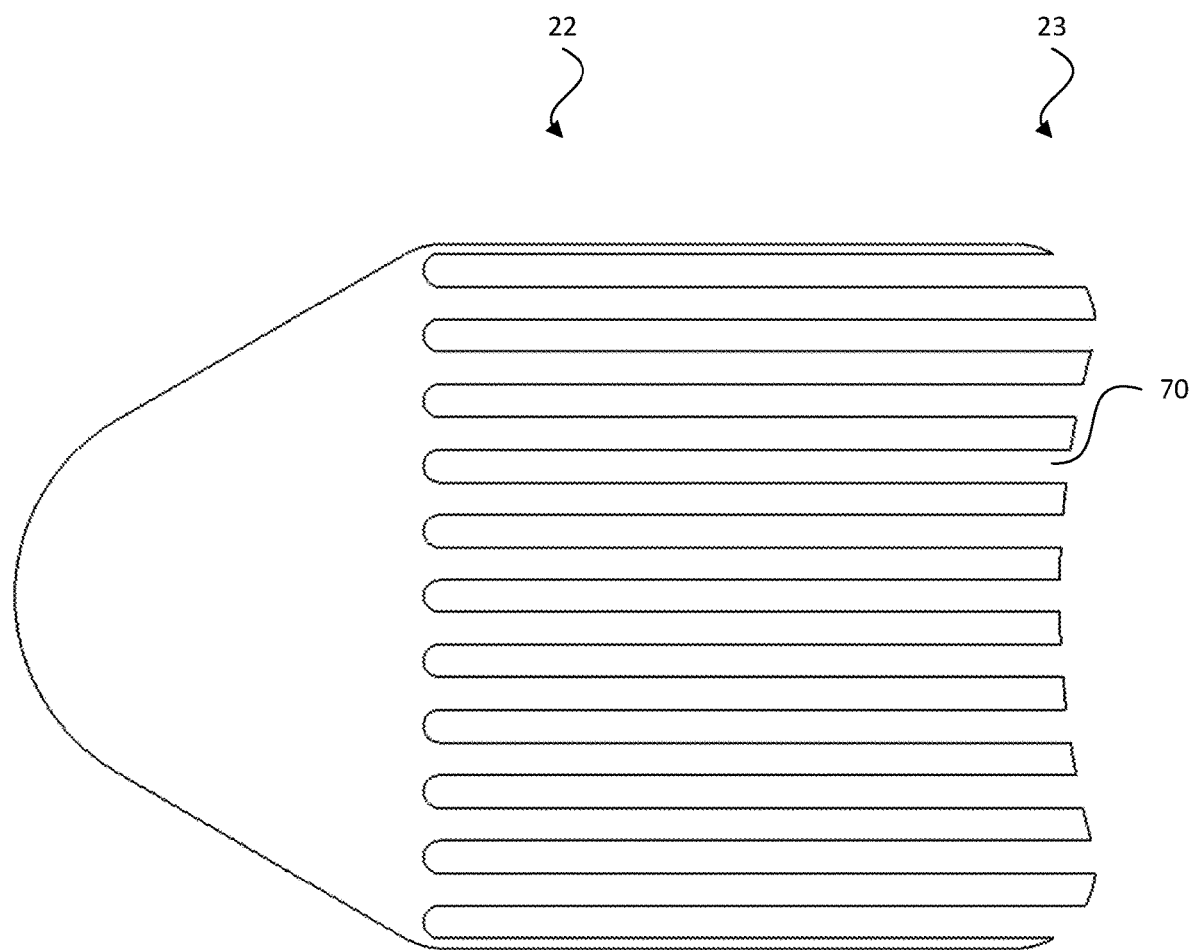
FIG. 7 illustrates lengthwise channels in the example transition structure of FIG. 2.
Figure 8:
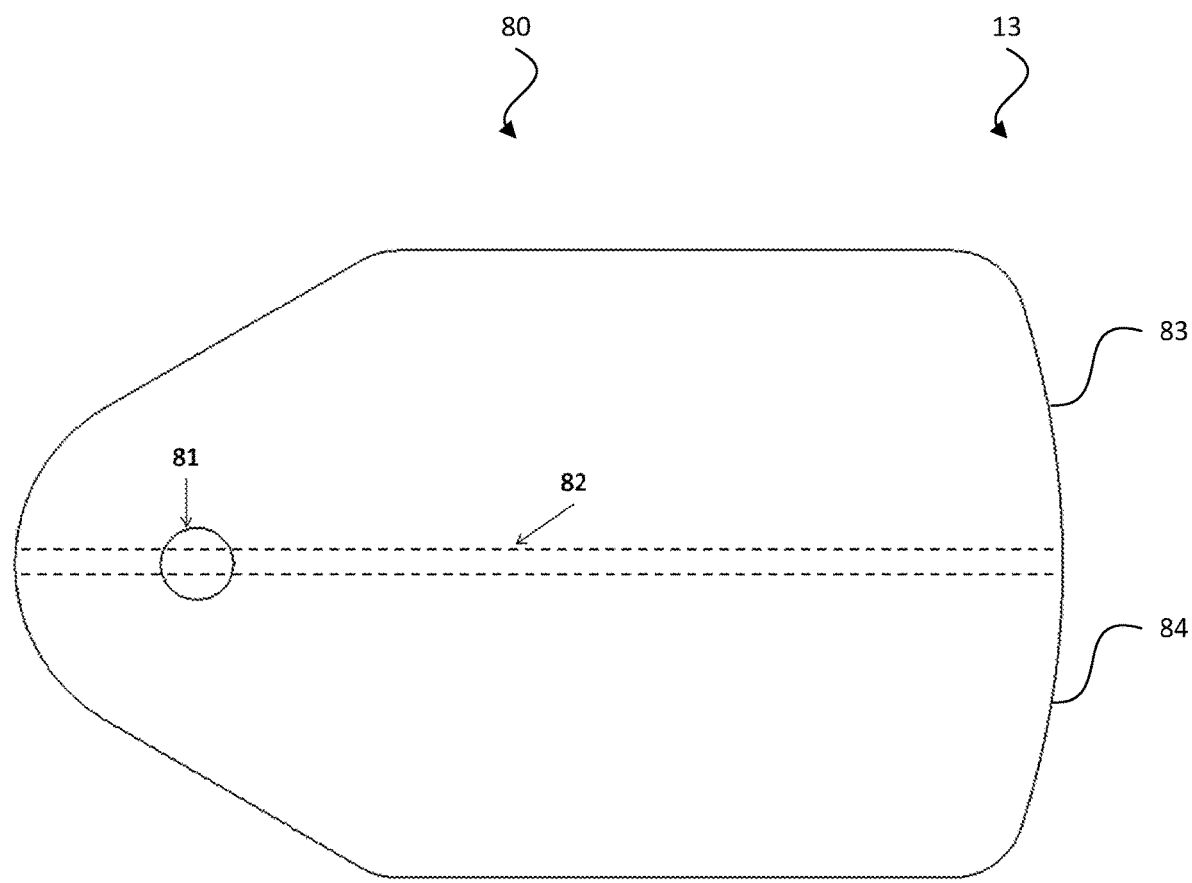
FIG. 8 illustrates seam placement when a single layer is comprised of multiple tapes in an example transition structure.

FIG. 6 illustrates another example of a fiber engagement region 12 and fiber transition region 13 having channels 60 extending lengthwise. The length may be defined in the direction of an axis 62 that extends from the free edge to the transition edge. The channels 60 may extend from the fiber transition region 13 and stop before the metal attachment region 11. The fiber tows may be embedded within the channels 60 such that one end of each fiber tow terminates within the transition structure. Once again, the corners may be filleted to prevent stress concentrations. FIG. 7 illustrates another example of the fiber engagement region 22 and fiber transition region 23 having channels 70 extending lengthwise. FIG. 8 illustrates an example of a transition structure 80 that may be formed by overlapping portions. In an aspect, an additive manufacturing technique (e.g., ultrasonic additive manufacturing) or particular additive manufacturing apparatus may have dimensional limits. For example, a UAM apparatus may have a maximum width of 1 inch for a tape to be consolidated in a layer, so multiple tapes may be used to form a single layer. The first tape 83 and the second tape 84 may overlap to form a seam 82. The seam 82 may be aligned with a spot weld location 81. The spot weld may reinforce the seam 82. Further the seam 82 may be oriented transverse (e.g., perpendicular) to channels in an adjacent layer. Although the transition structure 80 is shown with a single seam 82, it should be appreciated that a larger transition structure may include multiple seams.

Figure 9:
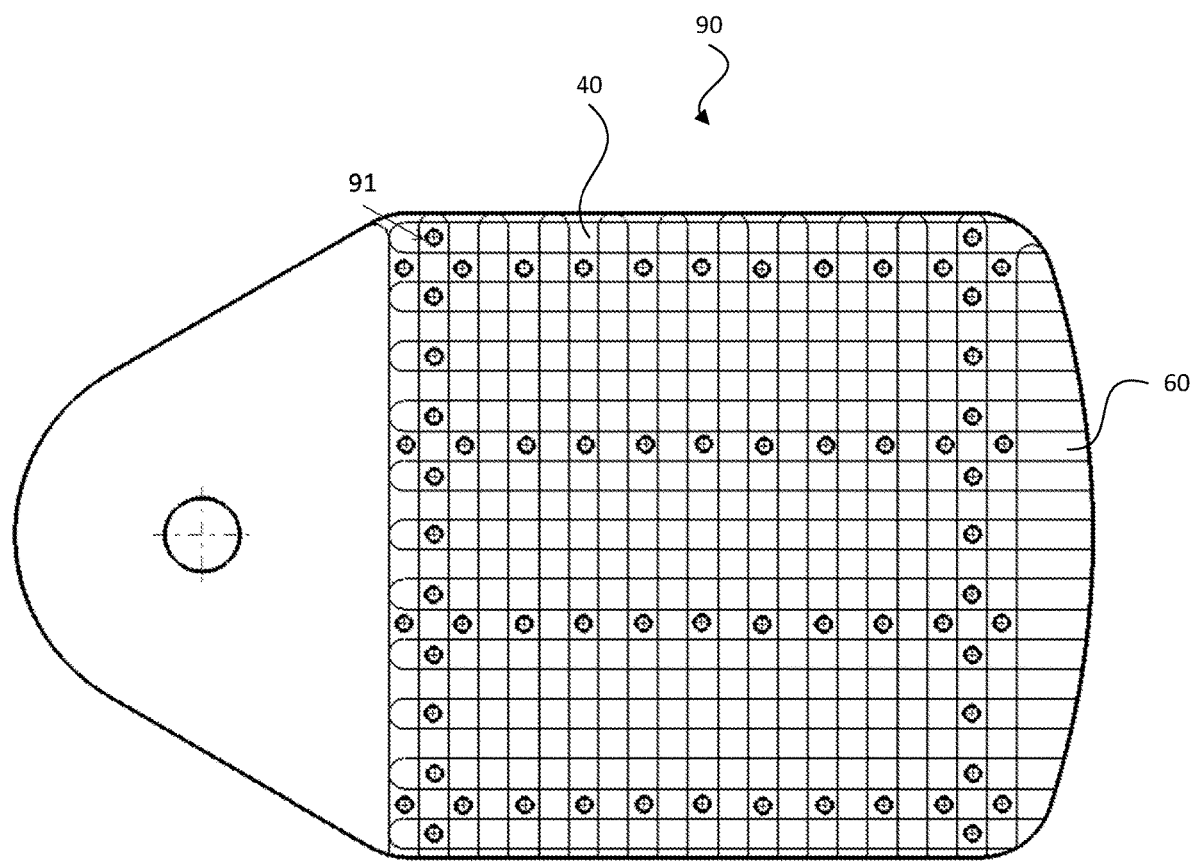
FIG. 9 illustrates sprue holes in an example transition structure.

FIG. 9 illustrates a transition structure 90 having sprue holes 91. FIG. 9 also illustrates overlapping channels. The transition structure 90 may be fabricated in a layer-by-layer manner using additive manufacturing. A different shape and/or orientation of channels may be selected for each layer. Some layers may include no channels. In the illustrated example, channels 40 extending across the width of the transition structure 90 and channels 60 extending lengthwise overlap in different layers. Orienting the channels and fiber tows embedded therein may improve strength of the transition structure. For example, if one layer is subject to the tows pulling out, a neighboring layer may be subject to shear. The combined layers, however, may mitigate the weaknesses of the neighboring layers.

Each sprue hole 91 may be aligned with one or more channels 40 and/or channels 60. The sprue holes 91 may allow a binding material (e.g., epoxy) to flow through the metallic portion of the transition structure 90 to wet the embedded fiber tows (e.g., when using resin transfer molding) and allow air to exit the transition structure 90. For example, a sprue hole may be located at the end of a blind channel to allow air to be expelled. Moreover, the fiber tows may be impregnated with binding material before being inserted into the channels 40, 60. Accordingly, the binding material entering the sprue holes 91 may bind with the binding material impregnated into the fiber tows. The binding material may therefore form a 3-dimensional lattice interlocked with the metallic portion. In an aspect, the sprue holes 91 may be fabricated on a layer-by-layer basis. For example, each layer of the metallic material may include an opening in the same location such that when the layers are consolidated the openings align to form the sprue holes 91. Additionally, the sprue holes may be staggered such that the binding materials flows from a first sprue hole, through a channel, and to a second sprue hole. The sprue holes 91 may also be drilled through the transition structure 90. The sprue holes may extend through one or more layers. For example, the sprue holes may extend through a top layer or a bottom layer to ensure that air bubbles do not get trapped within the binding material during curing.

Figure 10:
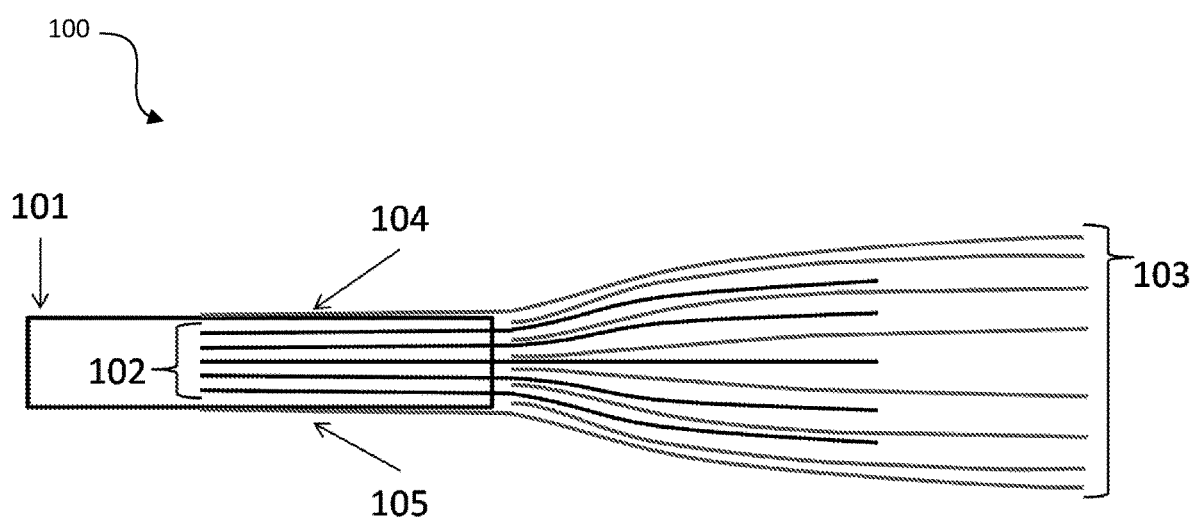
FIG. 10 illustrates a side section view of an example transition structure in engagement with a layered fiber structure.

FIG. 10 illustrates a side section view of an example transition structure 100 in interlayered arrangement with a layered fiber laminate structure 103. Fiber tows from a fabric laminate patch 102 may be embedded within the metal portion 101 to form the fiber portion 6 and have free edges extending out of the metal portion 101 toward the layered fiber laminate structure 103. The free edges of the fabric laminate patch 102 may be interleaved between layers of the layered fiber laminate structure 103 such that layers of fabric laminate patch 102 alternate with layers of the layered fiber laminate structure 103. In an aspect, a top layer 104 and a bottom layer 105 of the layered fiber laminate structure 103 may overlap the metal portion 101. For example, the top layer 104 and the bottom layer 105 may cover the sprue holes 91 (FIG. 9) and be bonded to an external surface of the metal portion 101 via the binding material. Such external layers may prevent delamination and may also contribute to the overall strength of the transition structure. In an aspect, both the patch 102 and the layered fiber laminate structure 103 are impregnated with the binding material. The transition structure 100 and the layered fiber laminate structure 103 may be heated and/or compressed to bind and cure the binding material to form a solid composite component.

Figure 11:
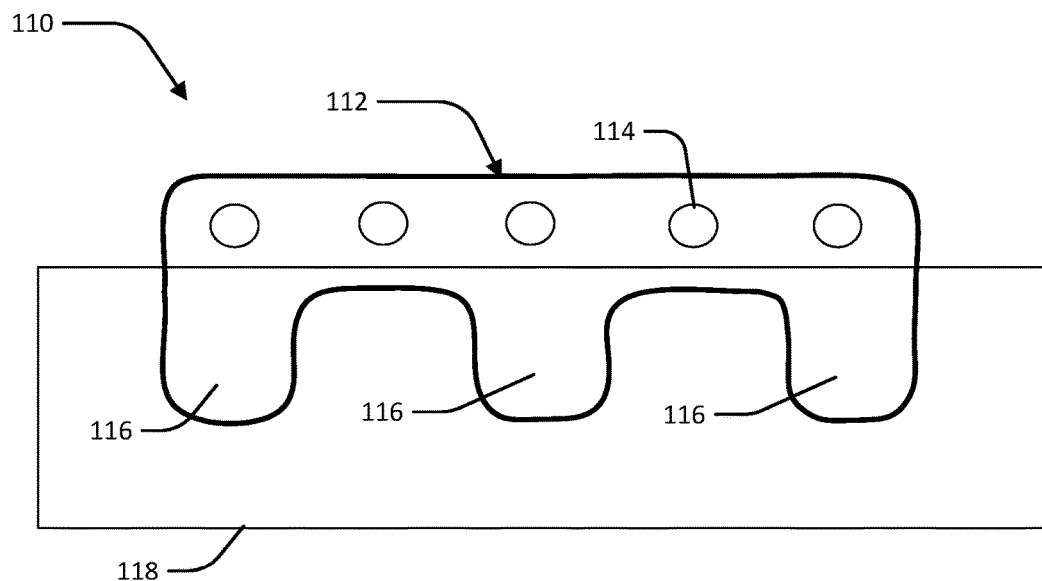
FIG. 11 illustrates an example transition structure with multiple metal attachment regions and multiple fabric engagement regions.

FIG. 11 illustrates an example of a transition structure 110 including a metal attachment region 112 including multiple attachment points 114 (e.g., spot welds). The transition structure 110 may include multiple fiber engagement regions 116. The multiple attachment points 114 may reduce stresses due to twisting. The metal attachment region 112 may be similar to the metal attachment region 11. Each of the fiber engagement regions 116 may be similar to the fiber engagement region 12. For example, each of the fiber engagement regions 116 may include channels for retaining tows of the fabric 118.

Figure 12:
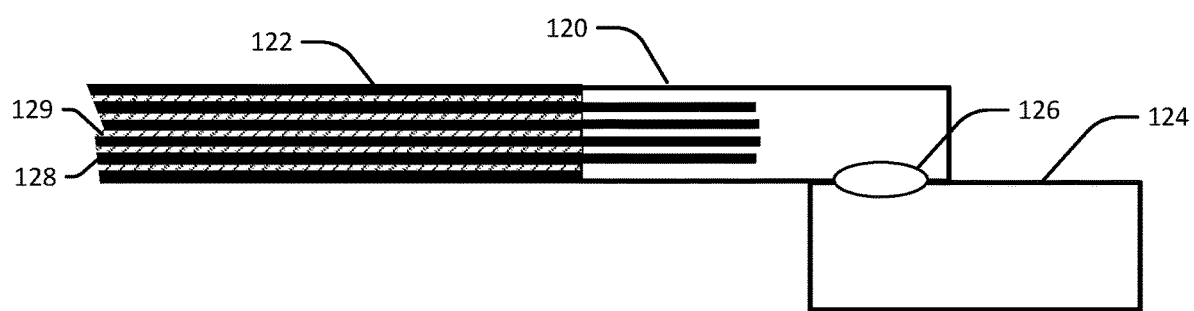
FIG. 12 illustrates an example of a transition structure joining a composite vehicle structure to a metallic vehicle frame.

FIG. 12 illustrates an example of a transition structure 120 joining a composite vehicle component 122 to a metallic vehicle frame 124. The composite vehicle component 122 includes multiple layers of fiber 128 and layers of resin 129. At least some of the layers of fiber 128 extend into the transition structure 120 and are embedded within a metallic portion of the transition structure 120. The transition structure 120 is joined to the metallic vehicle frame 124 using a spot weld 126. The spot weld 126 may be located at a portion of the transition structure 120 that does not include fiber.

Figure 13:
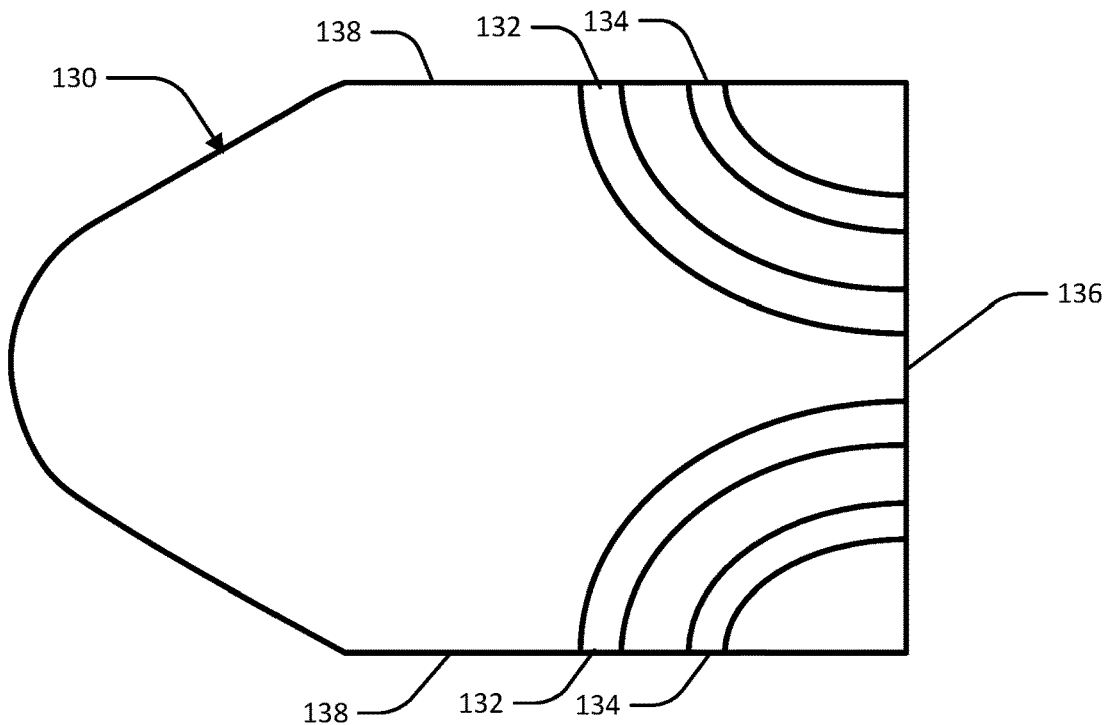
FIG. 13 illustrates an example transition structure including curved channels.

FIG. 13 illustrates an example transition structure 130 including curved channels. The transition structure 130 may include a transition edge 136 and side edges 138. Each of the inner curved channels 132 may curve from the transition edge 136 to one of the side edges 138. Similarly, each of the outer curved channels 134 may curve from the transition edge 136 to one of the side edges 134. In an aspect, for example, an inner curved channel 132 and an outer curved channel may be concentric arcs. The curved channels 132, 134 may provide a curved path for the fiber tows. Accordingly, a fiber tow extending through one of the curved channels 132, 134 may extend from the transition edge 136 in a first direction and may extend from a side edge 138 in a second direction that is substantially perpendicular to the first direction. This may, for example, allow the fiber tow to be bonded to a woven fiber fabric along both directions of the weave. The curved channels 132, 134 may also help prevent pullout of the fibers from the transition structure.

Figure 14:
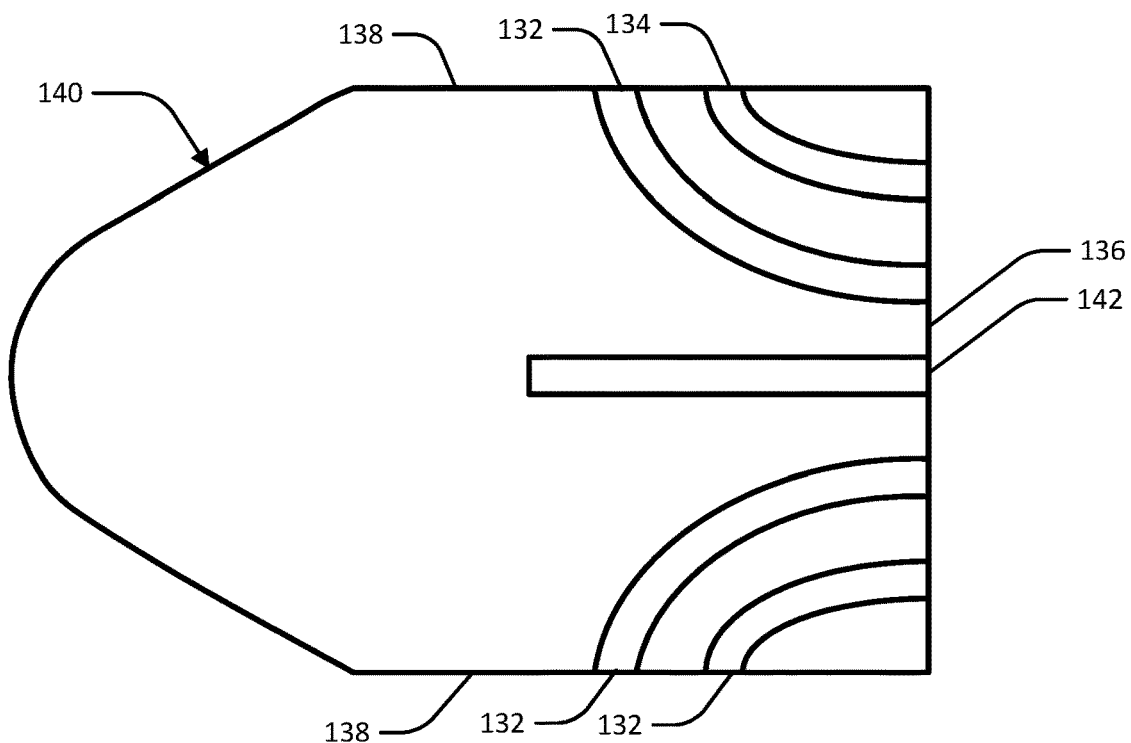
FIG. 14 illustrates an example transition structure including straight channels and curved channels.

FIG. 14 illustrates an example transition structure 140 including straight channels and curved channels. The transition structure 140 may be similar to the transition structure 130 and include curved channels 132, 134 curving from a transition edge 136 to one of side edges 138. The transition structure 140 may also include one or more straight channels 142. For example, the straight channel 142 may be centrally located between the inner curved channels 132.

Figure 15:
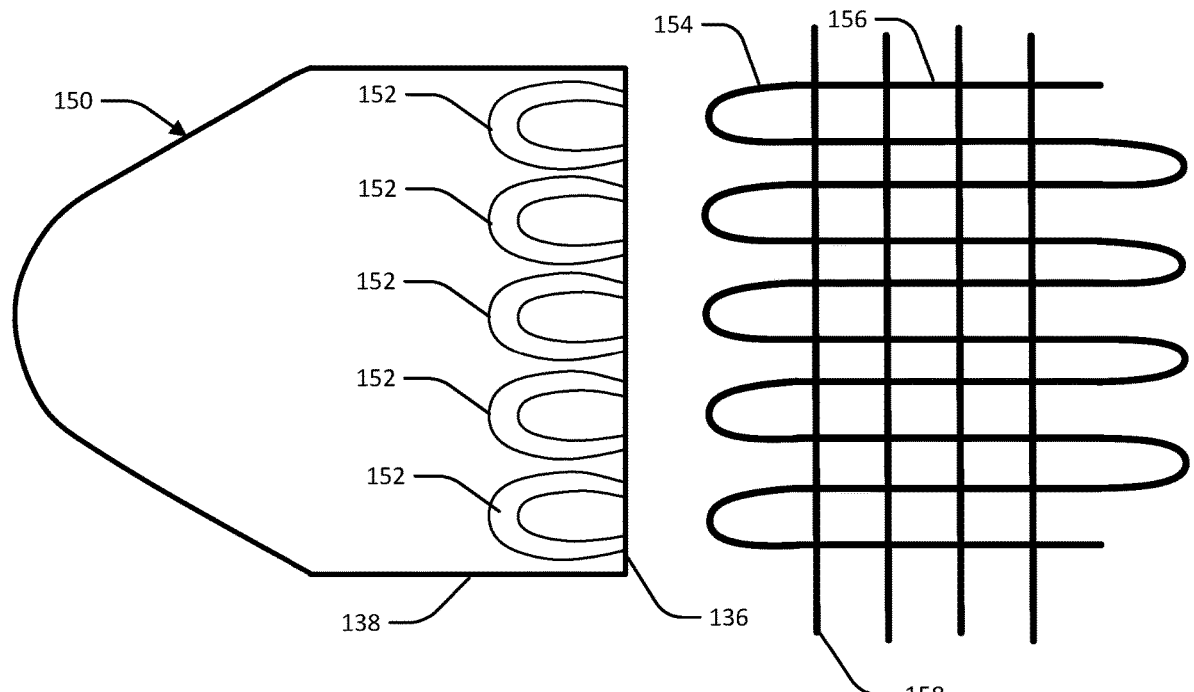
FIG. 15 illustrates an example transition structure including looped channels.

FIG. 15 illustrates an example transition structure 150 including looped channels 152. The transition structure 150 may have a transition edge 136 and side edges 138. In an implementation, the looped channels 152 may be located along the transition edge 136 such that two ends of each looped channel 152 are located on the transition edge 136. The looped channels 152 may be adapted to receive a looped fiber tow of a fiber fabric. For example, a fiber fabric may include natural loops 154 formed by a continuous weft tow 156. In an aspect, no pre-processing of the fiber fabric may be needed for the natural loops 154 to be inserted into the looped channels 152. In another aspect, one of more warp tows 158 may be removed from the fabric to allow the natural loops to extend from the edge of the fiber fabric. The natural loops 154 may then be placed within the looped channels 152 and consolidated.

Figure 16:
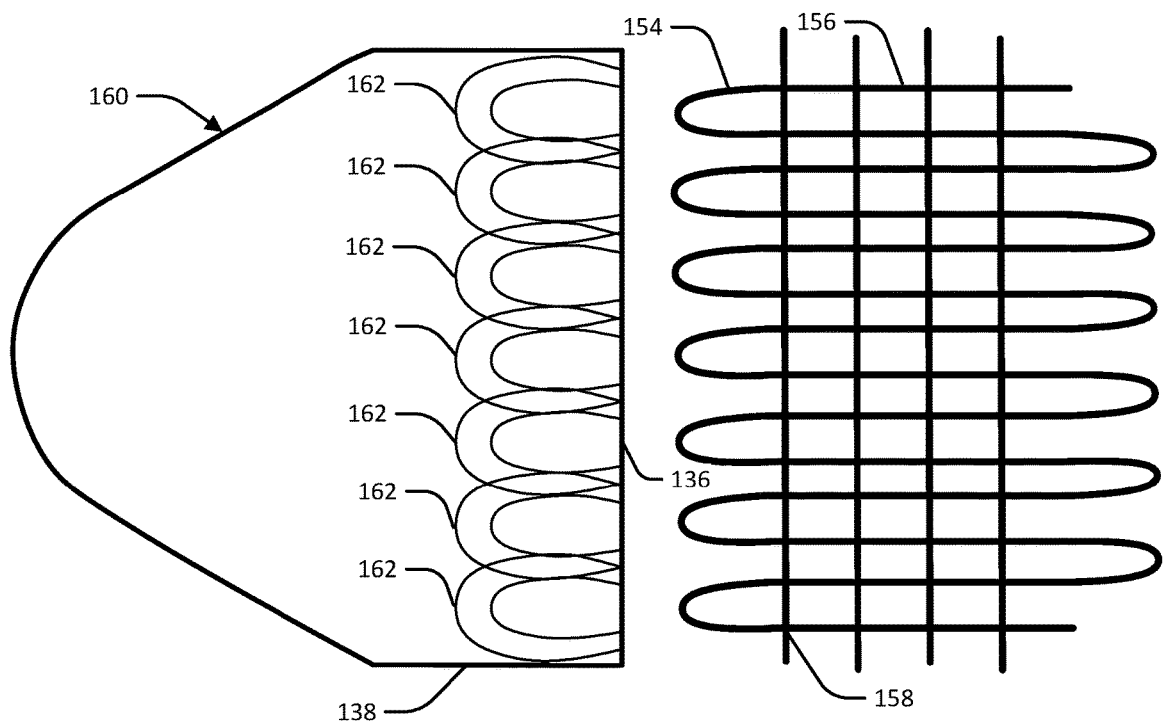
FIG. 16 illustrates an example transition structure including overlapping looped channels.

FIG. 16 illustrates an example transition structure 160 including overlapping looped channels 162. The transition structure 160 may include a transition edge 136 and side edges 138. Similar to the transition structure 150, the overlapping looped channels 162 may be located along the transition edge 136. The overlapping looped channels 162 may each overlap with an adjacent channel. The overlapping looped channels 162 may be used with a more tightly woven fabric. In another example, a pattern of natural loops 154 (e.g., every third loop) may be used with the transition structure 150, while a higher frequency pattern (e.g., every loop or every other loop) may be used with the transition structure 160. In another example, loops of a first layer of fabric may be placed into every other overlapping looped channel 162 and loops of a second layer of fabric may be placed into the remaining overlapping looped channels 162. The loops of various layers may then be consolidated within the overlapping looped channels 162.

Figure 17:
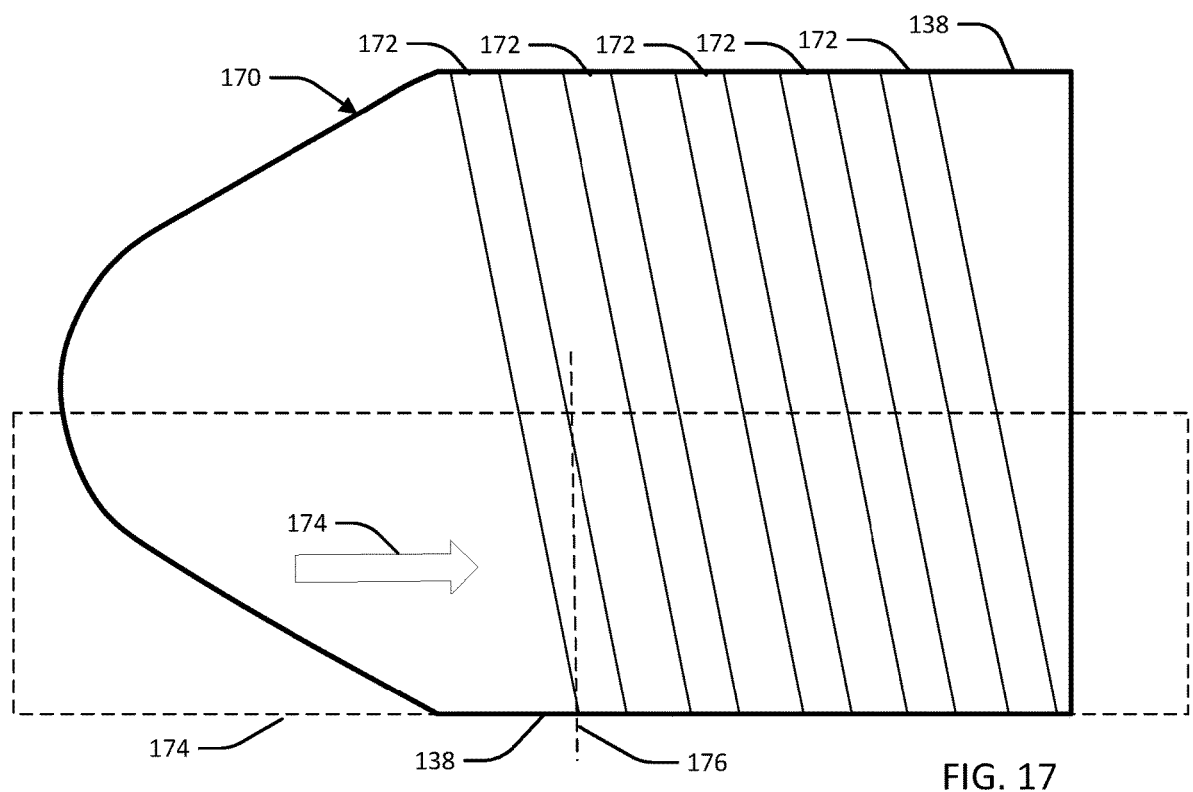
FIG. 17 illustrates an example transition structure including angled channels.

FIG. 17 illustrates an example transition structure 170 including angled channels 172. The angled channels 172 may extend across the transition structure 170 between side edges 138. In an aspect where ultrasonic additive manufacturing is used to form the transition structure 170, the angled channels 172 may help prevent tearing of the metallic foil as it is being ultrasonically welded to the consolidated metallic portion of the transition structure. In particular, foil tearing may be more likely to occur when a channel is perpendicular to a direction of movement of the sonotrode relative to the transition structure. The fiber tows may act as a lubricant causing the foil to move and tear as the sonotrode passes over the channels. Such foil tearing may lead to a defective part. By angling the channels 172 with respect to the travel direction 174, at least a portion of a foil tape 178 may be in contact with the preceding metallic layer as the sonotrode moves in the travel direction 174. For example, at the line 176 where the sonotrode reaches the first angled channel 172 along the side edge 138, the sonotrode may also contact the metallic portion at the far edge of the angled channel 172. The angle and width of the angled channels 172 may be selected to minimize foil tearing.

Figure 18:
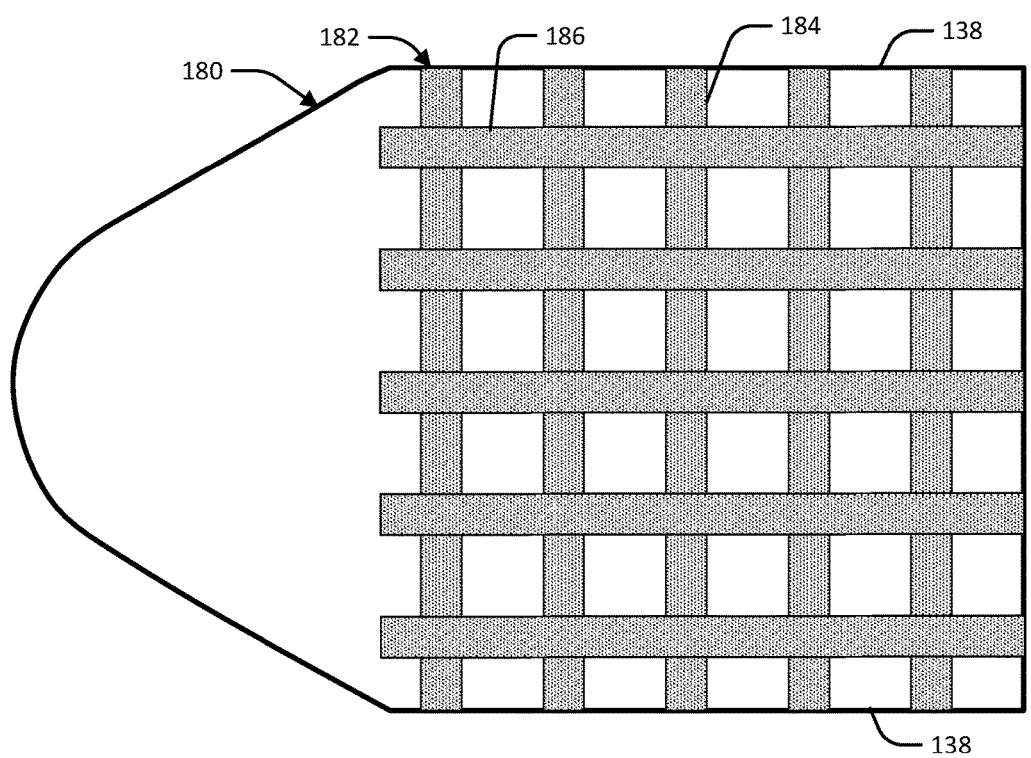
FIG. 18 illustrates an example transition structure including crossed channels.

FIG. 18 illustrates an example transition structure 180 including crossed channels 182. The crossed channels 182 may include longitudinal channels 184 extending from a metal attachment region 21 toward a transition edge 136 and perpendicular channels 186 extending between side edges 138. Tows of a fiber fabric may be inserted into the crossed channels 182 while leaving the woven structure of the fabric at least partially intact. For example, every other warp or weft tow may be removed from the fiber fabric, and the remaining tows may be placed into the crossed channels 182.

Figure 19:
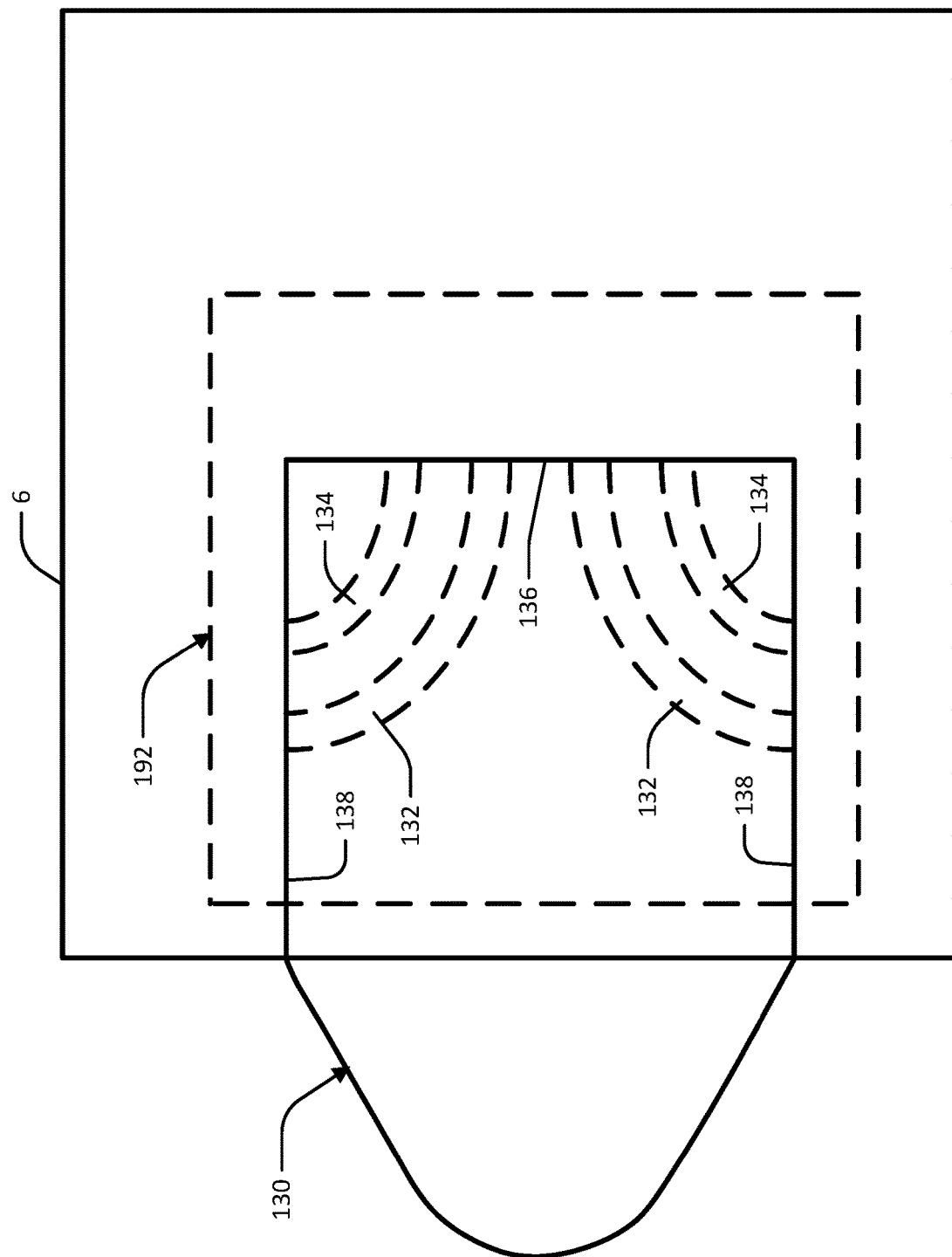
FIG. 19 illustrates an example transition structure including a metallic flange.

FIG. 19 illustrates an example transition structure 190 including a metallic flange 192. The metallic portion of the transition structure 130 is illustrated, but it should be appreciated that any of the metallic portions of the transition structures discussed above may be used with a metallic flange 192. The fiber engaging region of the transition structure 130 may contact multiple layers of fiber portion 6 with tows of each layer embedded within different sets of channels (e.g., curved channels 132, 134). The flange 192 may be formed by one or more metallic layers that extend beyond the side edges 138 and/or transition edge 136 of the transition structure 130. The flange 192 may be located between two layers of the fiber portion 6 such that the flange 192 is located internally in the fiber portion 6 of the transition structure. The flange 192 may increase the rigidity of the transition structure and help prevent twisting of the metallic portion.

Figure 20:
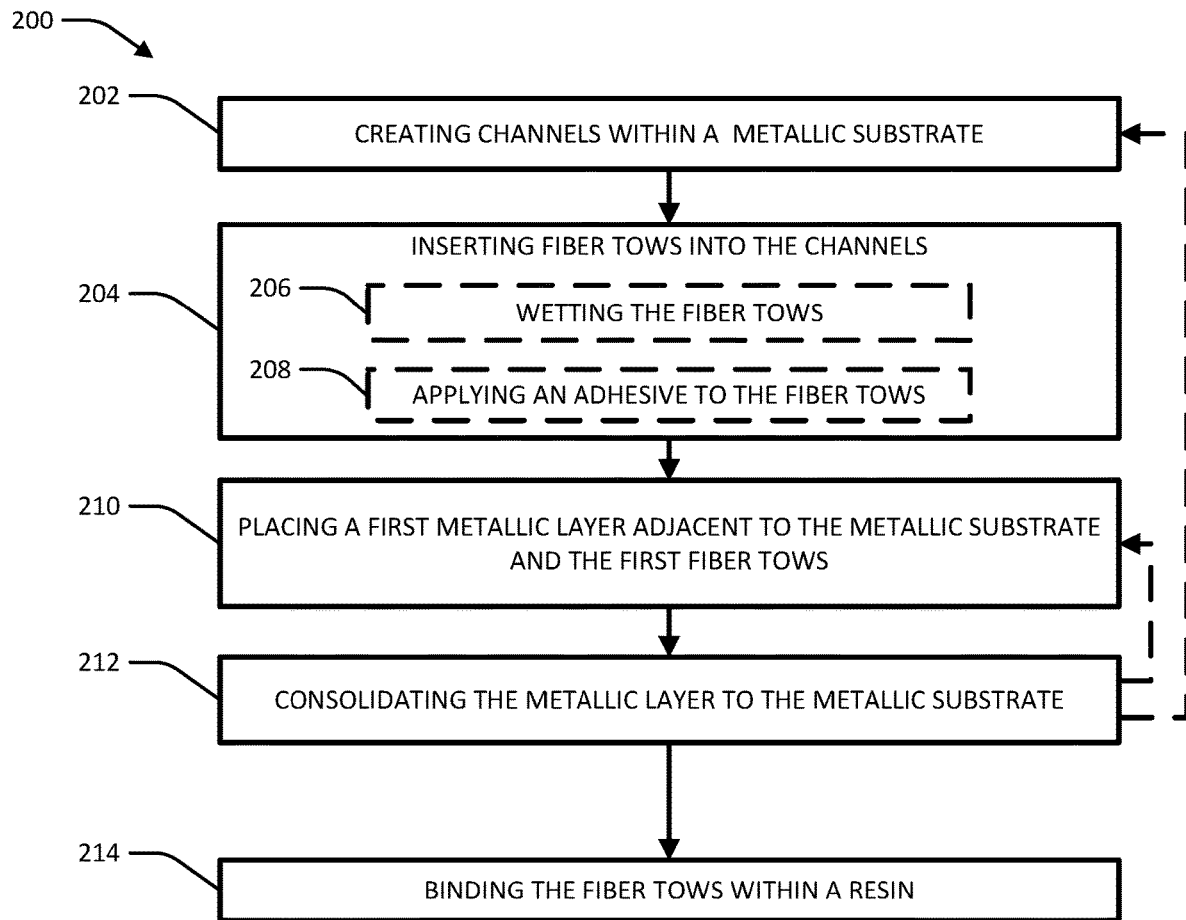
FIG. 20 is a flowchart showing an example method of manufacturing a transition structure.

FIG. 20 is a flowchart of an example method 200 of manufacturing a transition structure. The method 200 may be performed by an operator using equipment including an ultrasonic welding machine and other manufacturing tools and apparatuses known in the art. Although the method 200 is described below with respect to actions performed by an operator, one or more of the steps described herein may be automated.

In block 202, the method 200 may include creating channels within a metallic substrate. In an example, the metallic substrate may be a sheet of metal such as a sheet of aluminum. The channels may be created using methods for subtractive manufacturing known in the art. For example, cutting, milling, or laser ablation may be used to create first channels within the metallic substrate. In another example, the metallic substrate with channels may be formed using an additive manufacturing technique. For example, the channels may be formed by consolidating layers of metallic foil, where the layers of metallic foil include cutouts that form the channels. Combinations of additive and subtractive manufacturing may also be used to create the channels.

In block 204, the method 200 may include inserting fiber tows into the channels. The fiber tows may be individual fiber tows or may be part of a fiber fabric (e.g., a carbon fiber mat). In the case of a fiber fabric, specific tows may be isolated from the fabric, for example, by removing other tows within the fabric. The block 204 may also optionally include, at sub-block 206, wetting the fiber tows. For example, alcohol may be used to wet the fiber tows in order to more easily place the fiber tows within the first channels. The block 204 may also optionally include, at sub-block 208, applying an adhesive to the fiber tows and/or the first channels. For example, a spray adhesive may be applied before the fibers tows are inserted in the channels. The adhesive may help retain the fiber tows within the channels during subsequent steps.

In block 210, the method 200 may include placing a metallic layer adjacent to the metallic substrate and the fiber tows. For example, the metallic layer may be a metallic foil tape. The metallic layer may be placed by an ultrasonic welding machine during a welding operation.

In block 212, the method 200 may include consolidating the metallic layer to the metallic substrate. In an aspect, for example, the metallic layer may be consolidated to the metallic substrate using the ultrasonic welding machine. In an aspect, to reduce foil tearing, during a first pass, the ultrasonic welding machine may attach the metallic layer to the metallic substrate using a relatively low parameter set (e.g., low pressure, fast weld speed, low amplitude) for a first pass. The ultrasonic welding machine may weld the metallic layer to the metallic substrate using a relatively high parameter set (e.g, higher pressure, slower weld speed, and/or higher amplitude) for a second pass. The method 200 may optionally return to block 212 to add additional metallic layers. Each layer may be consolidated with the metallic substrate to increase the thickness of the consolidated metallic substrate. For example, in an implementation, 1-10, preferably 2-5 layers may be added sequentially.

The method 200 may optionally return to block 202 to add an additional layer of fiber tows. The consolidated metallic substrate and metallic layers may be treated as the metallic substrate. In an aspect, an additional layer of fabric tows may be placed in second channels offset from the first channels. Offsetting the first channels from the second channels may help avoid weak points within the transition structure. In another aspect, the second channels may be aligned with one or more of the first channels. Aligning the first channels with the second channels may allow the fibers to be joined by a resin, which may reduce fiber pullout. As discussed above with respect to FIG. 9, sprue holes may be used to connect channels.

In block 214, the method 200 may include binding the fiber tows within a resin. The resin may be applied to the fiber tows embedded within the metallic portion, as well as to the portions of fiber tows extending out of the metallic portion. The portions of the fiber tows extending out of the metallic portion may form a portion of a carbon fiber composite component. As illustrated in FIG. 10, binding the fiber tows within a resin may include interleaving the fiber tows between layers of fiber fabric.

Figure 21:
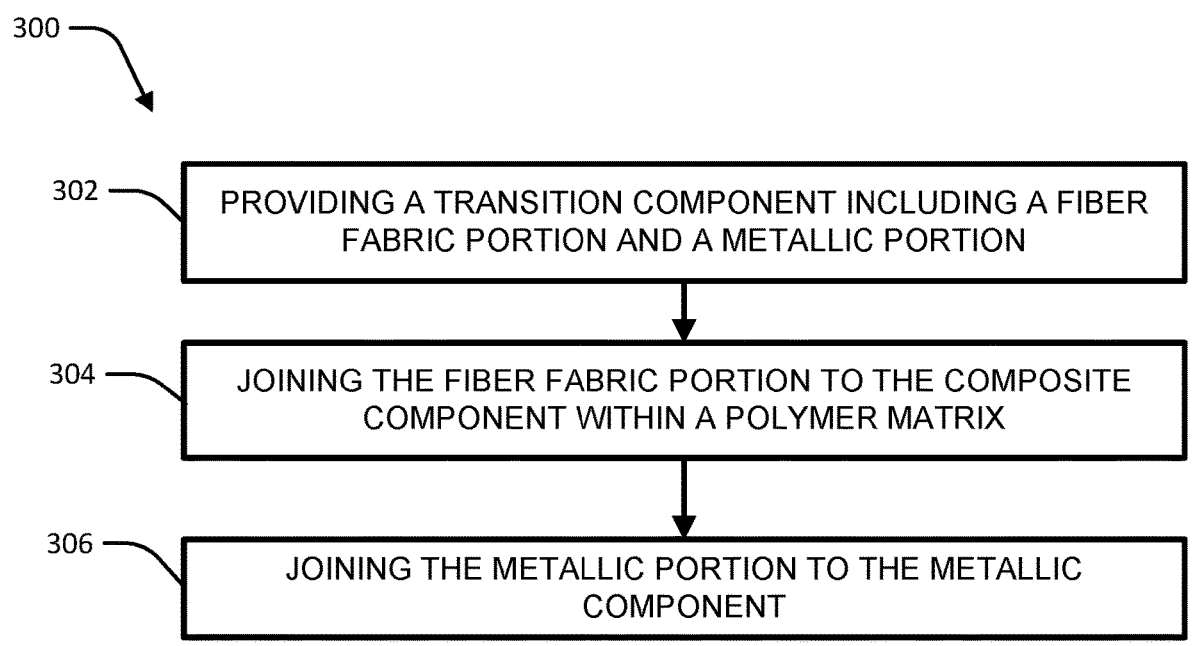
FIG. 21 is a flowchart showing an example method of using a transition structure to join a metal component and a fiber reinforced component.

FIG. 21 is a flowchart showing an example method 300 of joining a composite component to a metallic component. The method 300 may be performed by an operator using the tools described. Further, one or more steps of the method 300 may be automated, for example, using a robot or robotic arm to perform the described actions. Reference is made to FIG. 12, which illustrates a composite vehicle component 122 joined to a metallic vehicle frame 124 via a transition structure 120.

In block 302, the method 300 may include providing a transition component including a fiber fabric portion and a metallic portion. The transition structure 120 may be any of the example transition components described above. In an aspect, the fibers of the fiber fabric portion extend into and are embedded within the metallic portion. The fiber fabric portion may initially be unbound fibers. For example, the fiber fabric portion may be dry fiber tows, dry fiber fabric, or may be pre-impregnated with a resin.

In block 304, the method 300 may include joining the fiber fabric portion to the composite component within a polymer matrix. For example, the fiber fabric portion may be joined to the composite component by interleaving layers of the fiber portion 6 with fiber fabric layers of the composite vehicle component 122. A resin may be applied to the fiber portion 6 and the fiber fabric layers of the composite vehicle component 122 to form the composite vehicle component 122 with the transition component embedded within the composite vehicle component 122.

In block 306, the method 300 may include joining the metallic portion to the metallic component. The metallic component, for example, may be a metallic vehicle component such as the metallic vehicle frame 124. In an aspect, for example, the metallic portion may be welded to the metallic component using spot welds 126. It should be appreciated that other known techniques for joining metals (e.g., fasteners and other types of welding) may be used. Accordingly, in an aspect, the method 300 may allow the block 306 to be performed using machinery and techniques typically available in a vehicle assembly facility.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A transition structure, comprising:
   a metallic portion;
   a fiber portion including a plurality of tows embedded within the metallic portion and extending out from at least one edge of the metallic portion, wherein the plurality of tows are embedded within channels of the metallic portion; and
   a binding material forming a matrix surrounding the fiber portion embedded within the metallic portion.

2. The transition structure of claim 1, wherein the metallic portion includes a metal attachment region having a free edge and a fiber engagement region having a transition edge opposite the free edge, wherein the tows extend from the fiber engagement region.

3. The transition structure of claim 2, wherein at least one of the channels extends parallel to an axis defined from the metal attachment region toward the transition edge of the metallic portion and open toward the fiber portion.

4. The transition structure of claim 2, wherein at least one of the channels extends transverse to an axis defined from the metal attachment region toward the transition edge of the metallic portion at a non-right angle to the axis.

5. The transition structure of claim 2, wherein at least one of the channels curves from the transition edge to a side edge of the fiber engagement region.

6. The transition structure of claim 2, wherein at least one of the channels forms a loop with two openings on the transition edge.

7. The transition structure of claim 1, wherein a first subset of the channels extend in a first direction and a second subset of the channels extend in a second direction substantially perpendicular to the first direction.

8. The transition structure of claim 1, further comprising sprue holes in the metallic portion between the channels aligned with and extending transverse to the plurality of tows, the sprue holes filled with the binding material.

9. The transition structure, of claim 1, further comprising at least one metallic flange extending from the metallic portion between two layers of the fiber portion.

10. The transition structure of claim 1, wherein the fiber portion includes an outer layer of fabric adhered to a surface of the metallic portion.

11. The transition structure of claim 1, wherein the plurality of tows are embedded within channels of the metallic portion such that a free end of the fiber tows extends from each end of the channels.

12. The transition structure of claim 1, wherein the plurality of fiber tows include loops formed by a continuous tow of a fiber fabric.

13. A method of joining a composite component to a metallic component, comprising:
    providing a transition component including a fiber fabric portion, a metallic portion, and a binding material forming a matrix surrounding the fiber portion embedded within the metallic portion, wherein a plurality of tows forming the fiber fabric portion extend into at least one edge of the metallic portion and are embedded within the metallic portion, wherein the plurality of tows are embedded within channels of the metallic portion;
    joining the fiber fabric portion to the composite component within a polymer matrix; and
    joining the metallic portion to the metallic component.

14. A transition structure, comprising:
    a metallic portion; and
    a multi-layer fiber portion including a plurality of tows embedded within the metallic portion at different layers and extending out from at least one edge of the metallic portion.

15. The transition structure of claim 14, wherein the plurality of tows are embedded within channels of the metallic portion.

16. The transition structure of claim 14, wherein the metallic portion includes a metal attachment region having a free edge and a fiber engagement region having a transition edge opposite the free edge, wherein the tows extend from the fiber engagement region.

17. The transition structure of claim 14, further comprising at least one, metallic flange extending from the metallic portion between two layers of the fiber portion.

18. The transition structure of claim 14, wherein the fiber portion includes an outer layer of fabric adhered to a surface of the metallic portion.

19. The transition structure of claim 14, further comprising a binding material forming a matrix surrounding the fiber portion embedded within, the metallic portion.

20. A vehicle component, comprising:
    a fiber reinforced polymer body; and
    a metallic attachment portion,
    wherein at least a portion of the fiber reinforced polymer body is embedded within the metallic attachment portion, wherein the portion of the fiber reinforced polymer body is embedded within channels of the metallic portion, wherein fiber tows extend from at least one edge of the metallic attachment portion.

21. A transition structure, comprising:
    a metallic portion;
    a fiber portion including a plurality of tows embedded within the metallic portion and extending out from the metallic portion forming a fabric; and
    a binding material forming a matrix surrounding the fiber portion embedded within the metallic portion, wherein the metallic portion includes a metal attachment region having a free edge and a fiber engagement region having a transition edge opposite the free edge, wherein the tows extend from the fiber engagement region.

22. The transition structure of claim 21, further comprising at least one metallic flange extending from the metallic portion between two layers of the fiber portion.

23. The transition structure of claim 21, wherein the fiber portion includes an outer, layer of fabric adhered to a surface of the metallic portion.

24. A transition structure, comprising:
a metallic portion;
a fiber portion including a plurality of tows embedded within the metallic portion and extending out from the metallic portion forming a fabric;
a binding material forming a matrix surrounding the fiber portion embedded within the metallic portion; and
at least one metallic flange extending from the metallic portion between two layers of the fiber portion.

25. The transition structure of claim 24, wherein the fiber portion includes an outer layer of fabric adhered to a surface of the metallic portion.

26. A transition structure, comprising:
a metallic portion;
a fiber portion including a plurality of tows embedded within the metallic portion and extending out from the metallic portion forming a fabric; and
a binding material forming a matrix surrounding the fiber portion embedded within the metallic portion, wherein the fiber, portion includes an outer layer of fabric adhered to a surface of the metallic portion.

* * * * *